United States Patent
Wong et al.

(10) Patent No.: US 8,082,363 B2
(45) Date of Patent: Dec. 20, 2011

(54) MULTIPLEXED COMMUNICATION BETWEEN HOST COMPUTER AND SMARTPHONE USED AS WIRELESS MODEM

(75) Inventors: Yoon Kean Wong, Redwood City, CA (US); Justin Evan Manus, San Francisco, CA (US); Gurmeet Singh Kalra, Newark, CA (US); Alexandre Roux, Lédignan (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 590 days.

(21) Appl. No.: 11/433,045

(22) Filed: May 12, 2006

(65) Prior Publication Data
US 2007/0266173 A1 Nov. 15, 2007

(51) Int. Cl.
G06F 15/173 (2006.01)
(52) U.S. Cl. .................. 709/238; 709/250; 455/69
(58) Field of Classification Search .......... 709/248, 709/238
See application file for complete search history.

(56) References Cited

U.S. PATENT DOCUMENTS

| | | | |
|---|---|---|---|
| 7,483,432 B2 * | 1/2009 | Nuss et al. ............. | 370/395.3 |
| 2001/0021659 A1 | 9/2001 | Okamura | |
| 2002/0186676 A1 * | 12/2002 | Milley et al. ............ | 370/341 |
| 2004/0047461 A1 | 3/2004 | Weisman et al. | |
| 2004/0081093 A1 * | 4/2004 | Haddock et al. ........ | 370/230 |
| 2004/0268149 A1 * | 12/2004 | Aaron ..................... | 713/201 |
| 2006/0239266 A1 * | 10/2006 | Babbar et al. ........... | 370/392 |
| 2006/0294213 A1 * | 12/2006 | Saridakis ................ | 709/223 |
| 2007/0280105 A1 * | 12/2007 | Barkay et al. ........... | 370/229 |

OTHER PUBLICATIONS

Sackett et al. "Internetworking SNA with Cisco Solutions". Feb. 19, 1999. Cisco Press.*
Stevens. "TCP/IP Illustrated vol. 1: The Protocols". Apr. 11, 1995. Addison-Wesley Publishing Co. pp. 11, 340-343.*
Cisco Systems. "Internetworking Technologies Handbook, Fourth Ed." Sep. 11, 2003. Cisco Press.*
Hanks et al. "RFC1701: Generic Routing Encapsulation (GRE)". Oct. 1994. Network Working Group.*

* cited by examiner

*Primary Examiner* — Ajay Bhatia
*Assistant Examiner* — Bryan Lee

(57) ABSTRACT

Data is communicated between a first computing device and a second computing device over a transport employing a communication protocol in a multiplexed manner. The second computing device also includes wireless communication capabilities. Data is received from a first application and a second application through a first virtual port and a second virtual port, respectively, and packets are generated from the data. Tags corresponding to the first application or the second application are added to each packet. The packets are multiplexed and transmitted over the transport according to the communication protocol. The transmitted packets are de-multiplexed based upon the tags to reconstruct the data corresponding to the first or second application.

28 Claims, 8 Drawing Sheets

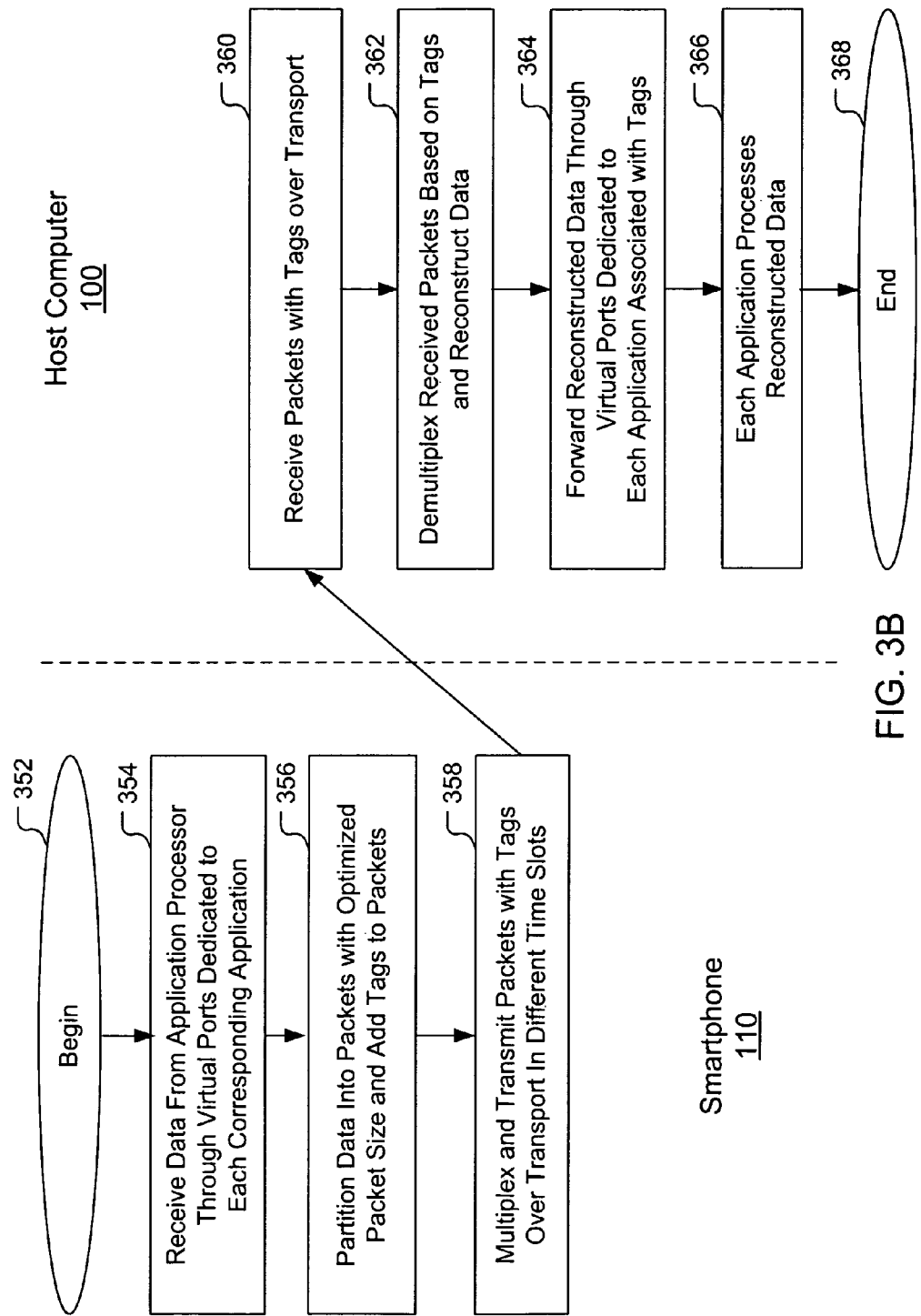

MULTIPLEXED COMMUNICATION BETWEEN HOST COMPUTER AND SMARTPHONE USED AS WIRELESS MODEM

CROSS-REFERENCE TO RELATED APPLICATION

This application is related to U.S. patent application Ser. No. 11/433,051, entitled "Secondary Channel in Multiplexed Communication between Host Computer and Smartphone," filed on May 12, 2006.

BACKGROUND OF THE INVENTION

1. Field of the Invention

The present invention relates to communication between a host computer and a smartphone used as a wireless modem for the host computer, and more specifically, to multiplexed communication between the host computer and the smartphone used as a wireless modem for the host computer to implement multiple virtual channels over a transport between the host computer and the smartphone.

2. Description of the Related Art

Smartphones are typically handheld devices that integrate personal information management or other computing capabilities with mobile telephone capabilities in the same device. This includes adding mobile telephone functions to already capable Personal Digital Assistants (PDAs), or putting computing ("smart") capabilities, such as PDA functions, into a mobile telephone.

Often, smartphones are designed for use with a host computer so that software and data on the smartphone can be managed and exchanged between the host computer and the smartphones. In addition, smartphones can often be used as a wireless modem (in so-called, "tethered mode") for the host computer with use of appropriate dialer/modem software on the host computer, because the smartphones themselves function as wireless communication devices (such as a cellular telephone) using a cellular telephone standard such as CDMA (Code Division Multiple Access) or GSM (Global System for Mobile Communications). For management of software and data or for use as a wireless modem, smartphones typically communicate with the host computer through a transport that is based upon a certain communication protocol, such as USB (Universal Serial Bus), a serial interface, IEEE 1394 interface, etc. In addition, there is usually only a single physical transport provided between the host computer and the smartphone, due to cost constraints and for simplicity of the circuitry of the devices.

Because the transport between the host computer and the smartphone uses a specific communication protocol, software applications running on the host computer and the smartphone in conventional systems are typically designed to communicate data over the transport according to the communication protocol used for the transport. For example, a USB transport would require that the software applications running on the host computer and the smartphone communicate data over the USB transport in compliance with the USB protocol.

In addition, because there is typically only a single (or other limited number of) physical transport between the host computer and the smartphone, it is not possible for multiple applications running on the host computer and/or the smartphone to exchange data over the transport simultaneously. For example, if the dialer application on the host computer is running to use the smartphone as a wireless modem for the host computer, then other applications on the host computer cannot exchange data with the smartphone over the transport because the dialer application would be exclusively using the transport.

Therefore, there is a need for a transport agnostic communication method over a transport between the host computer and the smartphone so that software applications running on the host computer or the smartphone need not be specifically designed to exchange data over the transport in accordance with a particular communication protocol. There is also a need for a technique for sharing the transport between the host computer and the smartphone among multiple software applications running simultaneously on the host computer and/or the smartphone.

SUMMARY OF THE INVENTION

Embodiments of the present invention include a computer-implemented method for communicating data between a first computing device and a second computing device over a transport employing a predetermined communication protocol, where the second computing device also includes wireless communication capabilities and the data is communicated over the transport in a multiplexed manner. Data is received in the first computing device from at least a first application and a second application through a first virtual port and a second virtual port associated with the first application and the second application, respectively, and packets are generated from the data. Tags corresponding to the first application or the second application are added to each packet to indicate which application the packets pertain to. The tags may indicate the first and second applications, or the first and second virtual ports through which the data was received, or the data types or priorities associated with the first and second applications, etc. The packets are then multiplexed by selecting the tagged packets corresponding to the data received from the first virtual port and the second virtual port. The multiplexed packets are then transmitted to the second computing device over the transport according to the predetermined communication protocol by transmitting the packets corresponding to the data received from the first virtual port and the second virtual port in different time slots. The transmitted packets are received by the second computing device and de-multiplexed based upon the tags to reconstruct the data corresponding to the first application or to the second application for processing by the second computing device.

Additional packets may also be received from the second computing device over the transport, wherein the additional packets include tags indicating the first and second applications, or the first and second virtual ports through which the data was received, or the data types or priorities associated with the first and second applications. The additional packets are then de-multiplexed by the first computing device based upon the tags for processing by the first application or the second application.

In one embodiment, the packets are generated with packet sizes optimized for the characteristics of the transport. In another embodiment, the packets are generated with the packet sizes dynamically adjusted depending upon the characteristics of the transport.

The first application and the second application are transport-agnostic in the sense that they need not be specifically configured to be consistent with the format or configuration of the predetermined communication protocol. Thus, data received from at least one of the first application and the second application can be in a format that is inconsistent with the predetermined communication protocol.

In addition, the transport practically includes multiple virtual channels that share the transport in different time slots. The primary channel may be used by, for example, a dial up networking application and the secondary channel may be used by another application. Therefore, multiple applications running on the first computing device can exchange data with the second computing device over the same transport simultaneously over separate virtual channels in a time shared manner.

In one embodiment, both the first application and the second application may run on the first computing device. In another embodiment, the first application runs on the first computing device and the second application runs on a third computing device remote from the first computing device and the second computing device, and the data from the second application is received from the third computing device over a network. In still another embodiment, the first application is a dial-up network application for utilizing the second computing device as a wireless modem for the first computing device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 3B is a flowchart illustrating the method of communication from the smartphone to the host computer over the transport including multiple virtual channels, according to one embodiment of the present invention.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1A:
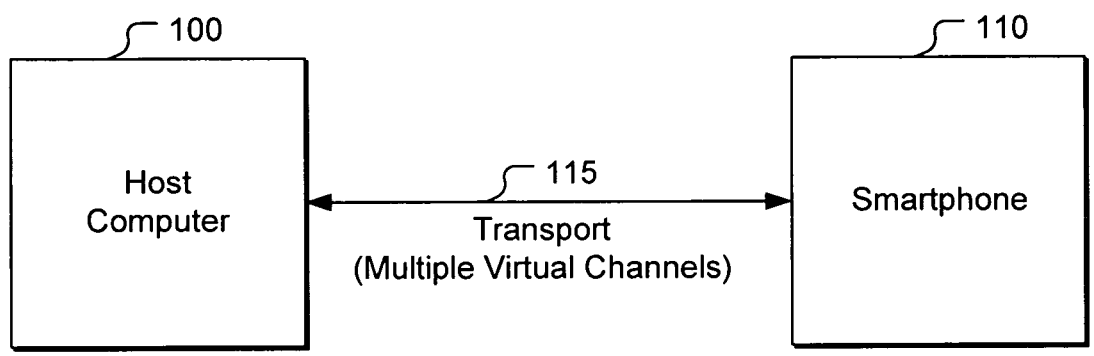
FIG. 1A illustrates a host computer communicating with a smartphone over a transport including multiple virtual channels, according to one embodiment of the present invention.

FIG. 1A illustrates a host computer 100 communicating with a smartphone 110 over a transport 115 including multiple virtual channels, according to one embodiment of the present invention. The host computer 100 may be a conventional personal computer such as a desktop computer or a laptop computer or any other type of computing device. The smartphone 110 may be a personal digital assistant (PDA) with cellular telephone capabilities, a cellular telephone with computing capabilities, or any other type of device that combines computing capabilities with wireless communication capabilities such as cellular telephone, WiFi (IEEE 802.11), or WiMax (wireless broadband communication). For the purpose of illustration only, the smartphone 110 will be described herein as a PDA with cellular telephone capabilities following the CDMA standard.

The smartphone 110 may be used as a cellular telephone modem for the host computer 100 in so-called "tethered mode." The host computer 110 may include a dial-up networking (DUN) application that enables use of the smartphone 110 as a cellular modem for the host computer 100. Data that is sent and received over a cellular telephone network through the smartphone 110 to/from a remote computer (not shown) is exchanged between the host computer 100 and the smartphone 110 over the transport 115.

In addition, the host computer 100 may include other applications that exchange data with the smartphone 110 over the transport 115. For example, the host computer 100 may include a radio logging application that collects information on the radio communication performance of the smartphone 110 or any other application that requires access to the smartphone 110 over the transport 115.

The host computer 100 and the smartphone 110 include MUX/DEMUX (multiplexing/de-multiplexing) software (not shown in FIG. 1A, to be explained below) that enables the host computer 100 and the smartphone 110 to communicate with each other over the transport 115 through multiple virtual channels in a time-shared manner. For example, a DUN application and a radio logging application may run on the host computer 100 simultaneously and exchange data with the smartphone 110 over the same transport 115 through different virtual channels in a time-shared manner as enabled by the MUX/DEMUX software.

Figure 1B:
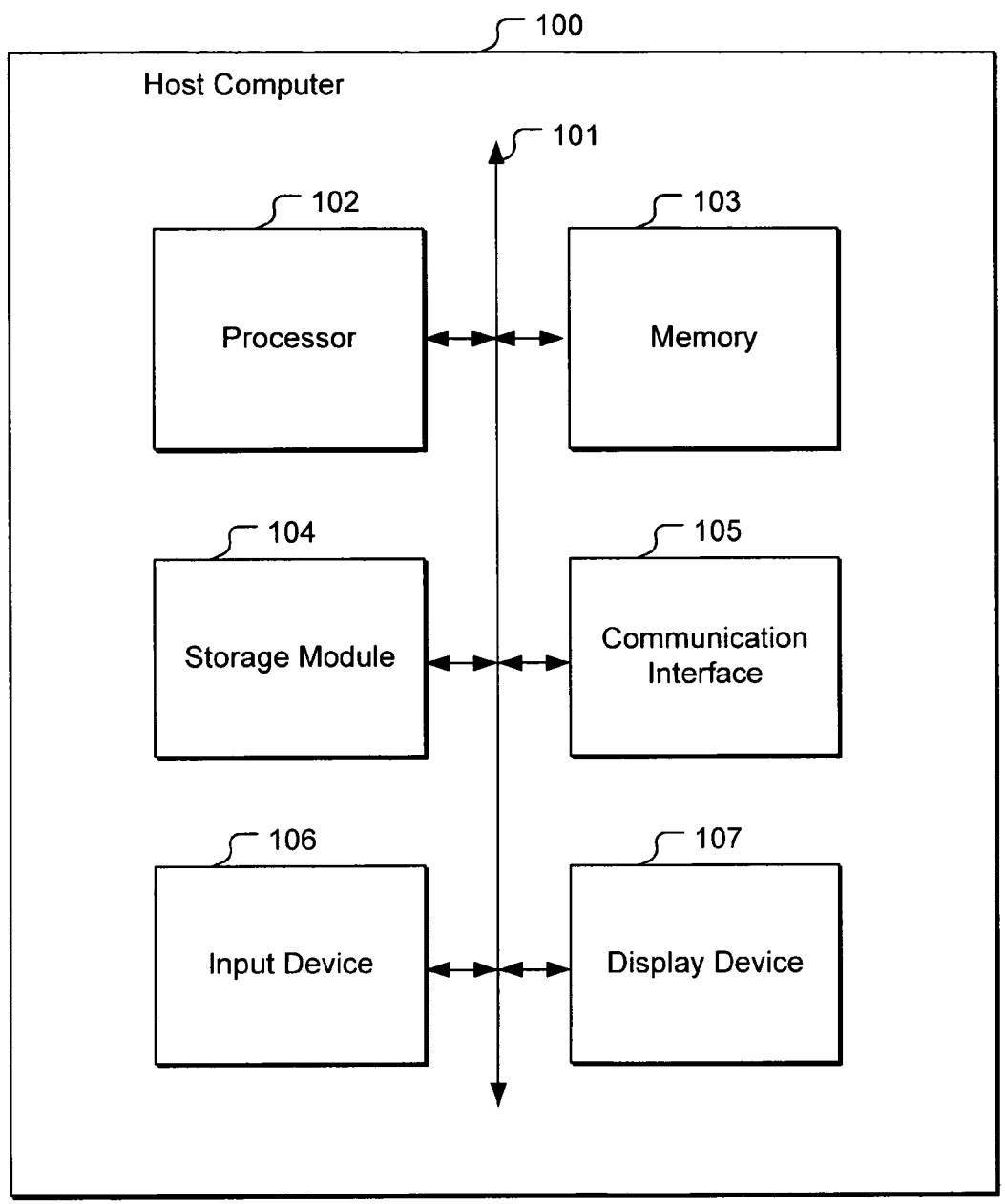
FIG. 1B illustrates the hardware architecture of the host computing device, according to one embodiment of the present invention.

FIG. 1B illustrates the hardware architecture of the host computer 100, according to one embodiment of the present invention. In one embodiment, the host computer 100 is a general purpose personal computer including a processor 102, a memory 103, a storage module (e.g., hard disk drive) 104, an input device (e.g., keyboard, mouse, and the like) 106, a display device 107, and a communication interface 105, exchanging data with one another through a bus 101. The communication interface 105 may include one or more interfaces used to communicate with the smart phone 110 over the transport 115 and exchange data. The communication interface 105 may be a USB (Universal Serial Bus) interface, a serial interface, a parallel interface, a Bluetooth interface, a WiFi (IEEE 802.11) interface, Ethernet, or any other type of wired or wireless communication interface. The storage module 104 stores software that is run by the processor 102 in conjunction with the memory 103 to manage the exchange of data between the host computer 100 and the smartphone 110 over the transport 115. Other application software may also be stored in the storage device 104. Note that not all components of the host computer 100 are shown in FIG. 1C and that certain components not necessary for illustration of the present invention are omitted herein.

Figure 1C:
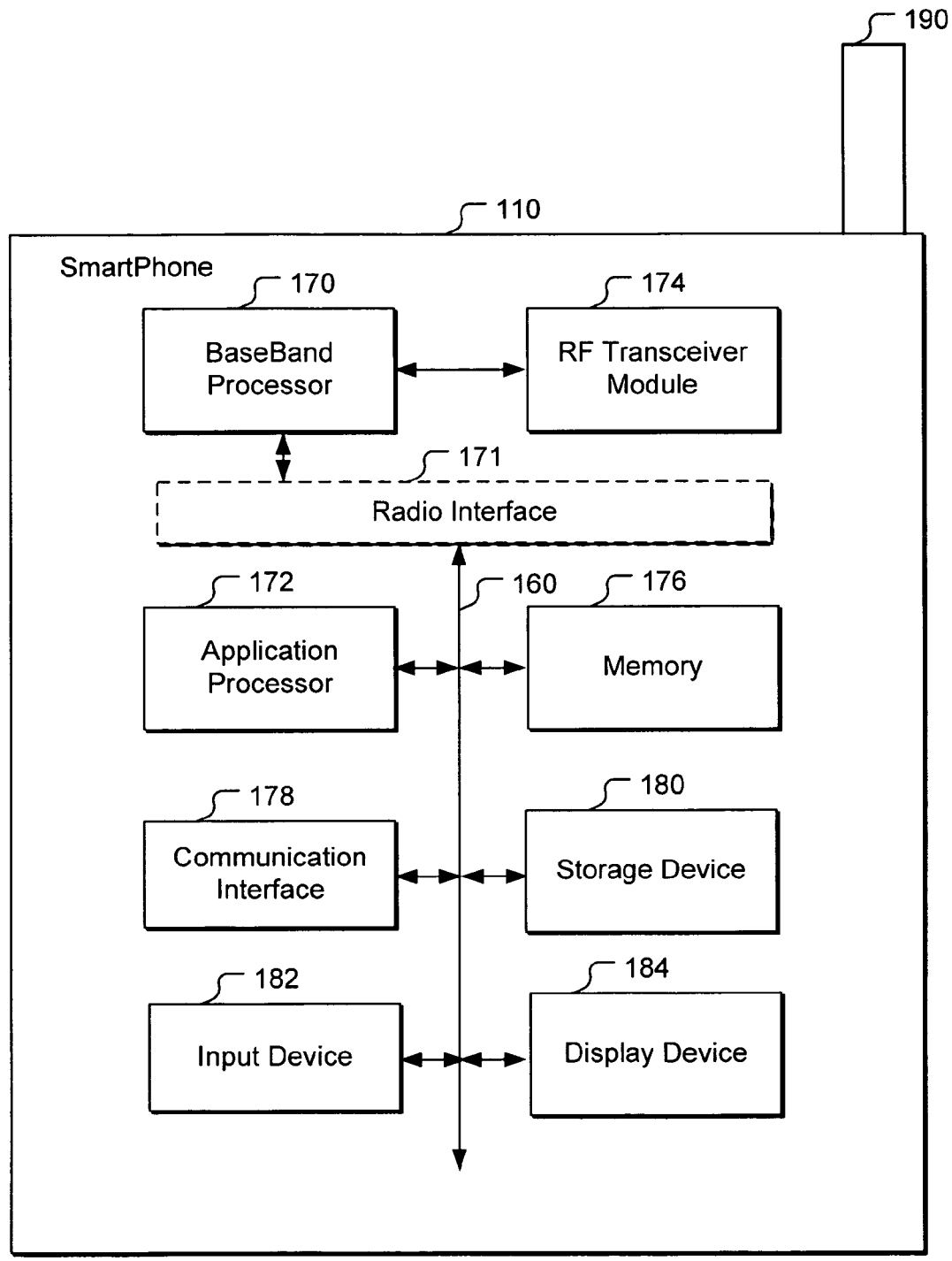
FIG. 1C illustrates the hardware architecture of the smartphone, according to one embodiment of the present invention.

FIG. 1C illustrates the hardware architecture of the smartphone, according to one embodiment of the present invention. The smartphone 110 includes a radio portion dedicated to cellular telephone functions of the smartphone 110 and a PDA portion dedicated to the computing functions of the smartphone 110. The radio portion and the PDA portion exchange data with each other via a radio interface 171, such as a Serial UART (Universal Asynchronous Receiver Transmitter), USB, or the like. Note that not all components of the smartphone 110 are shown in FIG. 1C and that certain components (e.g., radio power management device) not necessary for illustration of the present invention are omitted herein.

The radio portion includes a baseband processor 170, an RF transceiver module 174, and an antenna 190. The baseband processor 170 modulates data to be transmitted and demodulates data received in accordance with the protocols of the cellular telephone standard employed by the smartphone 110. For example, the baseband processor 170 may be a CDMA baseband processor that modulates and demodulates data according to the CDMA standard. The baseband processor 170 may perform other functions to control the operation of the radio portion of the smartphone, such as determining and gathering information on the performance or characteristics of the cellular communication. The RF transceiver 174 amplifies and transmits the data modulated by the baseband processor 170 through the antenna 190 and also receives cellular communication data through the antenna 190 for demodulation by the baseband processor 170.

The PDA portion includes an application processor (or CPU) 172, a memory 176, a communication interface 178, an input devices 182, an optional storage device 180, and a display device 184. Each of the components of the PDA portion of the smartphone 110 may communicatively couple through a bus 160.

The application processor 170 is a conventional processor or controller such as an Intel® XScale® processor. The memory 174 is a conventional computing memory such as a random access memory (RAM). The storage module 180 is a conventional long term storage device, for example, a flash memory or a hard disk drive (e.g., magnetic hard drive). The storage module 180 typically stores conventional operating systems such as Palm OS® from PalmSource, Inc. or Windows CE or Windows Mobile from Microsoft® Corporation for use by the smartphone 110. It is noted that the smartphone 110 can also be configured for use with other operating systems, for example, Linux-based operating systems. The input device 182 can be a keyboard, a touch screen, or any other type of input device, and the display device 184 can be a liquid crystal display device.

Note that the smartphone 110 is a dual processor system in FIG. 1C, including a baseband processor 170 for controlling radio or cellular functions and an application processor 172 for controlling the PDA or computing functions. Therefore, it is possible for certain commands to be executed only on the application processor 172 without accessing the baseband processor 170. However, note that the smartphone 110 can also be configured as a single processor system where a single processor functions as the processor for both cellular functions and computing functions.

The communication interface 178 may include one or more interfaces used to communicate with the host computer 100 over the transport 115 and exchange data. The communication interface 178 may be a USB interface, a serial interface, a parallel interface, a Bluetooth interface, a WiFi interface, Ethernet, or any other type of wired or wireless communication interface.

Figure 2A:
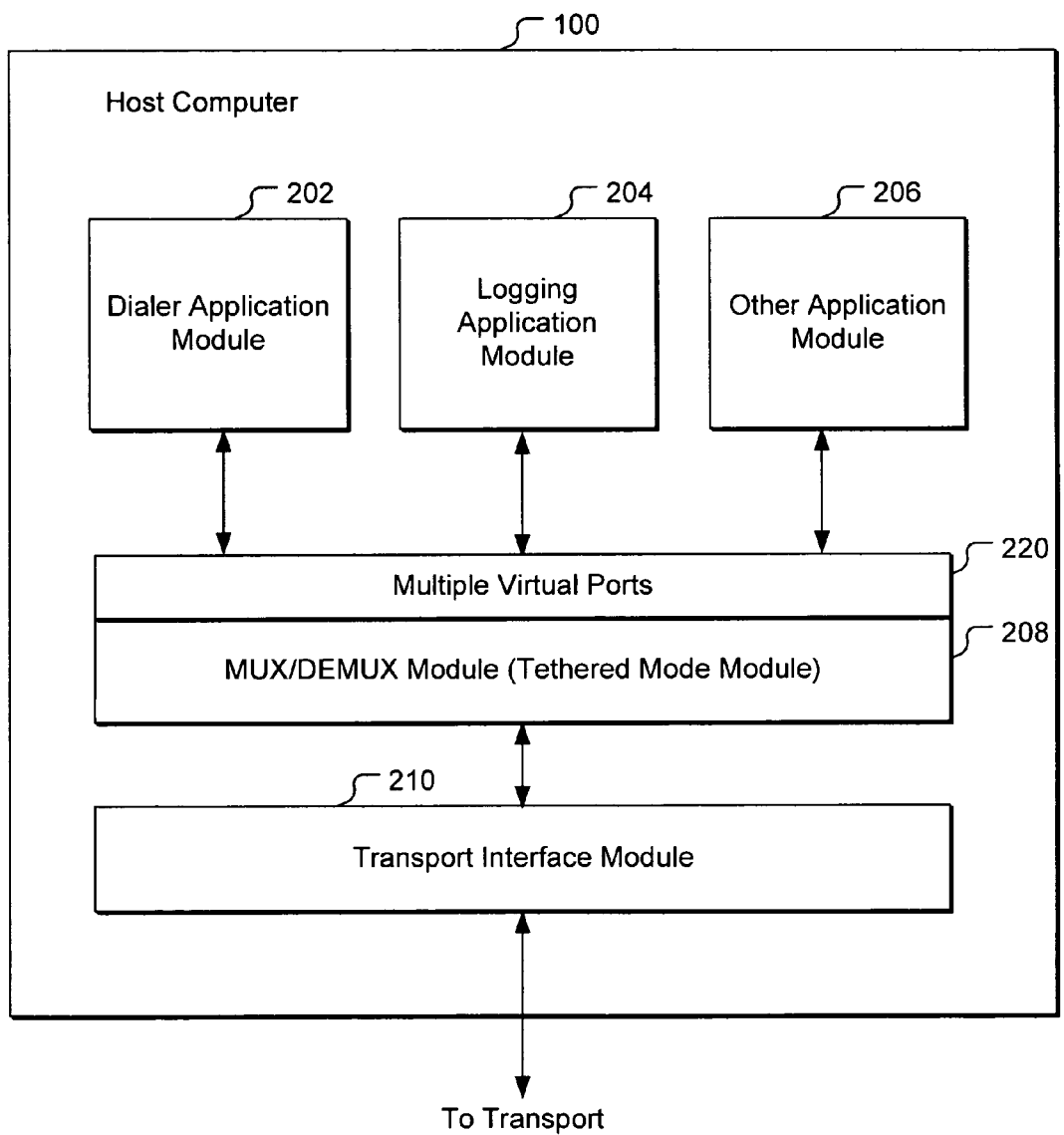
FIG. 2A illustrates the functional modules of the host computing device for transport-agnostic communication with a smartphone over a transport including multiple virtual channels, according to one embodiment of the present invention.

FIG. 2A illustrates the functional modules of the host computer 100 for transport-agnostic communication with a smartphone 110 over the transport 115 including multiple virtual channels, according to one embodiment of the present invention. Although shown as separate modules herein in FIG. 2A, the functional modules are typically implemented as software modules stored in computer readable storage medium such as the memory 103 or storage module 104 for execution by the processor 102. However, note that the functional modules of FIG. 2A may also be implemented as separate or combined hardware circuit blocks. FIG. 2A illustrates the example where the host computer 100 is running at least a dialer application module (DUN application) 202 for use of the smartphone 110 as a wireless modem for the host computer 100, a logging application module 204 for collecting radio and cellular communication information regarding the smartphone 110, and other applications 206 that communicate data with the smartphone 110 over a secondary channel (explained below) of the transport 115.

The dialer application module 202 includes software for conventional dial-up networking (DUN) capabilities (i.e., modem capabilities) for controlling and using the smartphone 110 as a wireless modem over a cellular telephone network for the host computer 100. The dialer application 202 operates as if it is communicating with a conventional wired modem, although it is the smartphone 110 that emulates the functionalities of the modem over alternate communication methods.

The logging application module 204 includes software for collecting radio/cellular communication performance information of the smartphone 110, such as signal strength, signal-to-noise (S/N) ratio, channel sounding, handoff, data throughput, and the like, or for determining service connect information indicating how the cellular telephone connection was established or release order information indicating how the cellular telephone call was disconnected. In a GSM cellular system, the radio communication performance information may include RSSI (Received Signal Strength Indication) data and BCCH (Broadcast Control Channel) data of the cellular telephone signals. In a CDMA system, the radio communication performance information may include RSSI data and FER (frame error rate) data of the cellular telephone signals.

The other applications 206 may include software for querying the battery level of the smartphone 110 over the transport 115, software for sending and receiving text messages using short message services (SMS), etc. The other applications 206 communicate over a separate virtual channel of the transport 115 different from the virtual channel of the transport 115 used by the dialer application 202 or the logging application 204. For purposes of illustration, the virtual channel of the transport 115 used by the dialer application 202 (for example, to send "AT" commands) is referred to herein as the "primary channel" and the virtual channel(s) used by any other applications 204, 206 is referred to herein as "secondary channel." The other application 206 may also be a single application on the host computer 100 that communicates with multiple applications on the smartphone 110.

The dialer application 202, the logging application 204, and other applications 206 all communicate with the smartphone 110 over the transport 115 with the assistance of the MUX/DEMUX module 208 and the transport interface module 210. Multiple applications 202, 204, 206 can communicate over the transport 115 at the same time, because the MUX/DEMUX module 208 enable the applications 202, 204, 206 to transmit data over the transport 115 over separate virtual channels implemented within the same transport 115. Specifically, the MUX/DEMUX module (also referred to herein as the "tethered mode module") 208 receives data from the various applications 202, 204, 206 simultaneously but through separate virtual ports 220 each of which is associated with one of the applications. For example, the dialer application 202 may send data over to the MUX/DEMUX module 208 over a virtual port 1, while the logging application 204 and the other application 206 send data to the MUX/DEMUX module 208 over virtual ports 2 and 3, respectively. The virtual ports can be different types of ports on either end of the host computer 100 and the smartphone 110 or between the applications 202, 204, 206.

The MUX/DEMUX module 208 generates packets based on the received data and adds tags to the packets received from the applications 202, 204, 206 indicating through which virtual port 220 the data was received, and then multiplexes the packets so that the packets are sent to the transport interface module 210 in different time slots. In other embodiments, the tags may indicate a data type or priority of the associated application rather than indicating the associated virtual port. Different types of tags are used for the associated virtual ports, the associated data types or priorities of the associated application, or the associated applications themselves, etc., so that the packets corresponding to one virtual port, data type, priority, or application can be distinguished from packets corresponding to another virtual port, data type, priority, or application. For example, if the MUX/DEMUX module receives data from three different virtual ports 220 corresponding to the dialer application 202, the logging application 204, and another application 206, the MUX/DEMUX module 208 operates as a logical switch that multiplexes the packets from the three virtual ports so that the packets corresponding to the dialer application 202, the logging application 204, and another application 206 are sent to the transport interface module 210 in different time slots. In a time-division implementation, the time slots are repeated periodically. However, the different time slots need not necessarily be repeated (alternated) periodically. For example, packets from one application or virtual port with a higher priority may occupy more time slots than those occupied by packets from other applications or virtual ports with a lower priority. Time slots unused by one virtual port may be allocated to other virtual ports. Thus, there need not be a fixed bandwidth limit per virtual port, and more time slots may be allocated to virtual ports associated with higher priority applications (e.g., the dialer application 202).

The MUX/DEMUX 208 module may also receive information on the characteristics or quality of communication over the transport 115 from various sources, such as the dialer application module 202, and dynamically adjust the size of the packets multiplexed and sent to the transport interface module 210 to be optimum for the characteristics or quality of communication over the transport 115. This is possible because the MUX/DEMUX 208 has control over how the packets are sent over to the transport 115. The MUX/DEMUX module 208 also generates the packets in a format consistent with the employed communication protocol of the transport 115 so that the transport interface module 210 can process the packets according to the employed communication protocol.

The transport interface module 210 processes the packets with the attached tags received from the MUX/DEMUX module 208, according to the employed communication protocol of the transport 115, so that the packets can be sent over the transport 115 to the smartphone 110. For example, in one embodiment the transport 115 is a USB transport and the transport interface module 210 includes the software interface and protocols for USB. Note that the communication protocol employed by the transport interface module 210 need not be the same as the communication protocol used for communication between the application processor 172 and the baseband processor 170 through the radio interface 171.

The packets transmitted over the transport 115 to the smartphone 110 are processed in a reverse manner by a MUX/DEMUX module 252 (FIG. 2B) of the smartphone 110, as will be explained below in greater detail. Specifically, the MUX/DEMUX module 252 of the smartphone 110 de-multiplexes the packets received from the host computer 100 over the transport based on the attached tags, and sends the packets to their corresponding virtual ports so that they can be processed by the appropriate application or hardware devices associated with the virtual ports.

Similarly, the MUX/DEMUX module 208 of the host computer 100 also de-multiplexes data packets received from the smartphone 110 over the transport 115 through the transport interface module 210. In this regard, the MUX/DEMUX module 252 of the smartphone 115 (to be explained in more detail below) also attaches to the data packets tags indicating the associated virtual ports, the associated applications, or the data types or priorities of the associated applications, and multiplexes the data packets to be sent to the host computer 100 similar to the MUX/DEMUX module 208 in the host computer 100. The MUX/DEMUX module 208 de-multiplexes the packets received from the smartphone 110 over the transport 115 based upon the attached tags, and sends them to the corresponding virtual ports as indicated by the tags attached to the packets.

Since the MUX/DEMUX module 208 and the transport interface module 210 are separate from each other, the applications 202, 204, 206 can be configured without being customized for the particular type of the transport 115 or its associated transport interface module 210. In other words, the applications 202, 204, 206 can be configured to send data to the MUX/DEMUX module 208 in a transport-agnostic manner, i.e., in a format or configuration that is inconsistent with the communication protocol employed by the transport 115. Only the MUX/DEMUX module 208 needs to be configured to communicate with the transport interface 210 according to its employed protocols, and the applications 202, 204, 206 can be designed regardless of the type of the employed transport 115. The MUX/DEMUX module 208 generates the packets based upon the data received from the applications 202, 204, 206 such that the packets are in a format consistent with the communication protocol employed by the transport 115. Therefore, this significantly contributes to simpler design of the software applications 202, 204, 206.

In addition, the transport 115 practically includes multiple virtual channels that share the transport 115. The primary channel is used by the dialer application module 202, and other applications 204, 206 use the secondary channel of the transport. Therefore, multiple applications running on the host computer 100 can exchange data with the smartphone 110 over the same transport 115 simultaneously over separate virtual channels in a time shared manner. Smartphone device-related applications, which would be in applications 204, 206, would not take up the primary channel bandwidth that is used by the dialer application 202 for use of the smartphone 110 as a wireless modem for the host computer 100. Note that the smartphone device-related applications 204, 206 may be configured to take up the primary channel bandwidth if the primary channel is not being used or is not being heavily used.

For example, the dialer application 202 can use the primary channel of the transport 115 to use the smartphone 110 as a wireless modem, while at the same time a battery gauge application 206 running on the host computer queries the remaining battery time of the smartphone 100 through a secondary channel of the transport 115 to access the smartphone. In such case, data from the dialer application 202 and the data or instructions from the battery gauge application 206 are transmitted over the transport 115 in a multiplexed manner in different time slots, over two separate virtual channels of the transport 115. At the same time, neither the dialer application 202 nor the battery gauge application 206 need to be configured specific to the type of the transport 115. The dialer application 202 and the battery gauge application 206 can be designed to be transport-agnostic regardless of the specific type or protocol of the transport 115, because they only directly communicate with the MUX/DEMUX module 208 that is separated from the transport interface 210 and the MUX/DEMUX module 208 takes data from applications in any format or configuration and is responsible for generating packets consistent with the employed communication protocol of the transport 115. Other examples of applications that may use the secondary channel include, but are not limited to, an application for receiving network or device logging information for the smartphone 110, an application for determining the cellular signal strength of the smartphone 110, an application for determining the network time of the smartphone 110, an application for determining the talk time of the smartphone 110, an application for sending and receiving short message service (SMS) messages, multimedia message service (MMS) messages, or emails through the smartphone 110, an application for determining the type of cellular network of the smartphone 110, etc. For another example, the secondary channel may be used for remote procedure calls between the host computer 100 and the smartphone 110. Note that a single application may also be configured to use both the primary and secondary channels as well.

Figure 2B:
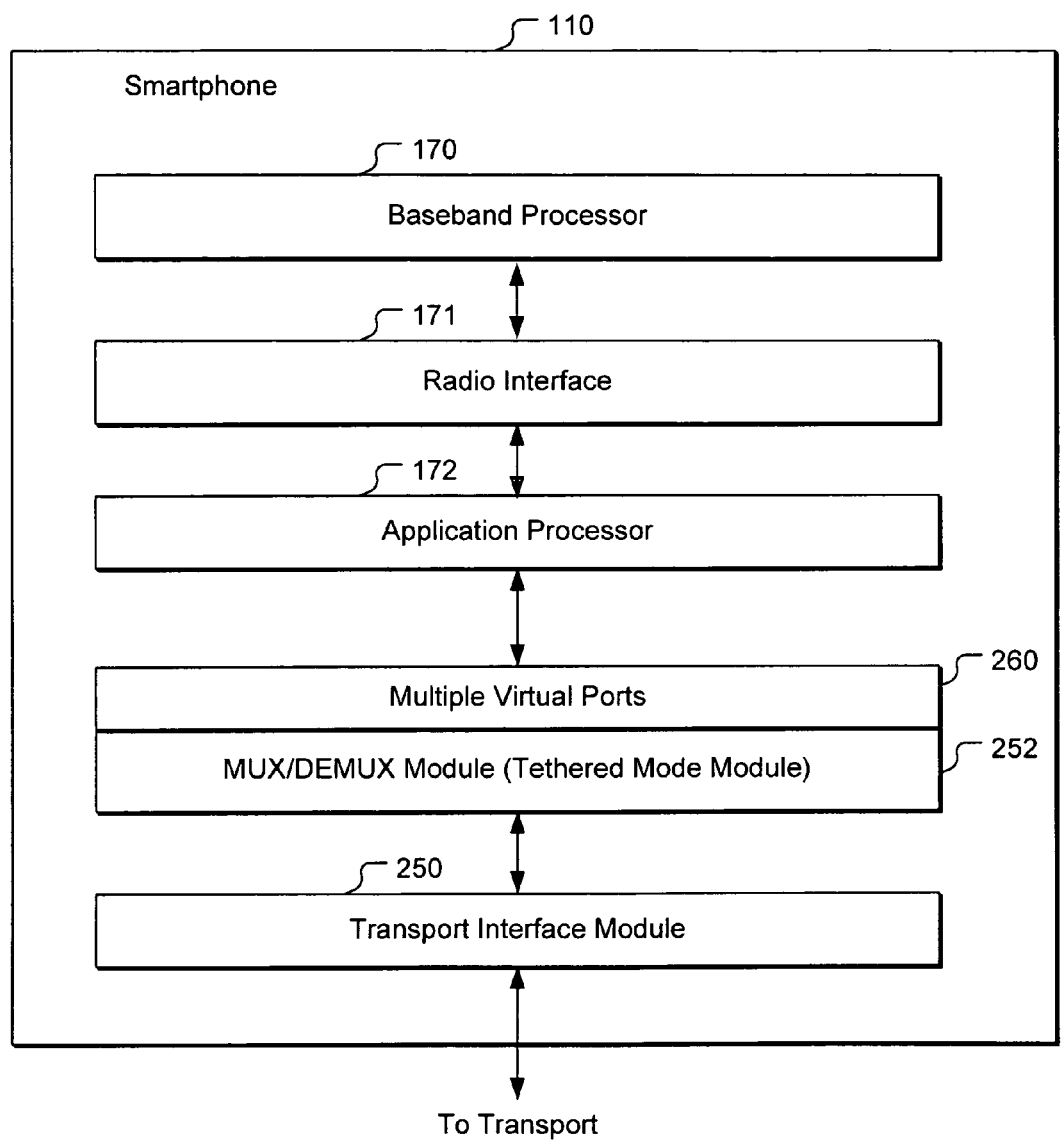
FIG. 2B illustrates the functional modules of the smartphone for transport-agnostic communication with the host computer over the transport including multiple virtual channels, according to one embodiment of the present invention.

FIG. 2B illustrates the functional modules of the smartphone 110 for transport-agnostic communication with the host computer 100 over the transport 115 including multiple virtual channels, according to one embodiment of the present invention. The functional modules include the transport interface module 250, the MUX/DEMUX module 252 (including the virtual ports 260). These functional modules are shown to operate in conjunction with the application processor 172, the radio interface 171, and the baseband processor 170 of the smartphone 110. Although shown as separate modules herein in FIG. 2B, these functional modules (transport interface module 250 and the MUX/DEMUX module 252) are typically implemented as software modules stored in computer readable storage medium such as the memory 176 or the storage device 180 for execution by the processor application processor 172. However, note that the functional modules of FIG. 2B may also be implemented as separate or combined hardware circuit blocks.

Packets sent from the host computer 100 over the transport 115 are received by the MUX/DEMUX module 252 through the transport interface module 250. The transport interface module 250 performs similar functions to the transport interface module 210 in the host computer 110. Specifically, the transport interface module 250 processes the packets with the attached tags received from the host computer 100 over the transport 115 according to the employed communication protocol of the transport 115, so that the packets can be passed on to the MUX/DEMUX module 252. For example, in one embodiment the transport 115 is a USB transport and the transport interface module 250 includes the software interface and protocols for USB.

The MUX/DEMUX module 252 of the smartphone 110 de-multiplexes the packets received from the host computer 100 over the transport 115 based on the attached tags, and sends the packets to their corresponding virtual ports 260 so that they can be processed by the appropriate application or hardware devices associated with the virtual ports 260. The de-multiplexed packets are processed by the associated applications running on the application processor 172 or the baseband processor 170.

The MUX/DEMUX module 252 also processes data received from applications running on the application processor 172 or the baseband processor 172 through their corresponding virtual ports 260, generates packets based on the received data and adds tags to the packets. The tags may indicate through which virtual port 260 the packets were received, or the associated applications themselves, or the data types or priorities of the associated applications. The MUX/DEMUX module 252 then multiplexes the received packets, so that the data received through the multiple virtual ports 260 are sent to the transport interface module 250 in different time slots. For example, if the MUX/DEMUX module 252 receives data from different virtual ports 260 corresponding to different applications running on the application processor 172 or the baseband processor 170, the MUX/DEMUX module 252 operates as a logical switch that multiplexes the packets corresponding to the data received through the different virtual ports 260 so that the packets corresponding to the different applications are sent to the transport interface module 250 in different time slots. The MUX/DEMUX 252 module may also receive information on the characteristics or quality of communication over the transport 115, and adjust the size of the packets multiplexed and sent to the transport interface module 250 to be optimum for the characteristics or quality of communication over the transport 115. Such packet sizes are synchronized with the packet sizes used by the MUX/DEMUX module 208 of the host computer 100. The MUX/DEMUX module 252 also generates the packets in a format consistent with the employed communication protocol of the transport 115 so that the transport interface module 250 can process the packets according to the employed communication protocol.

Figure 3A:
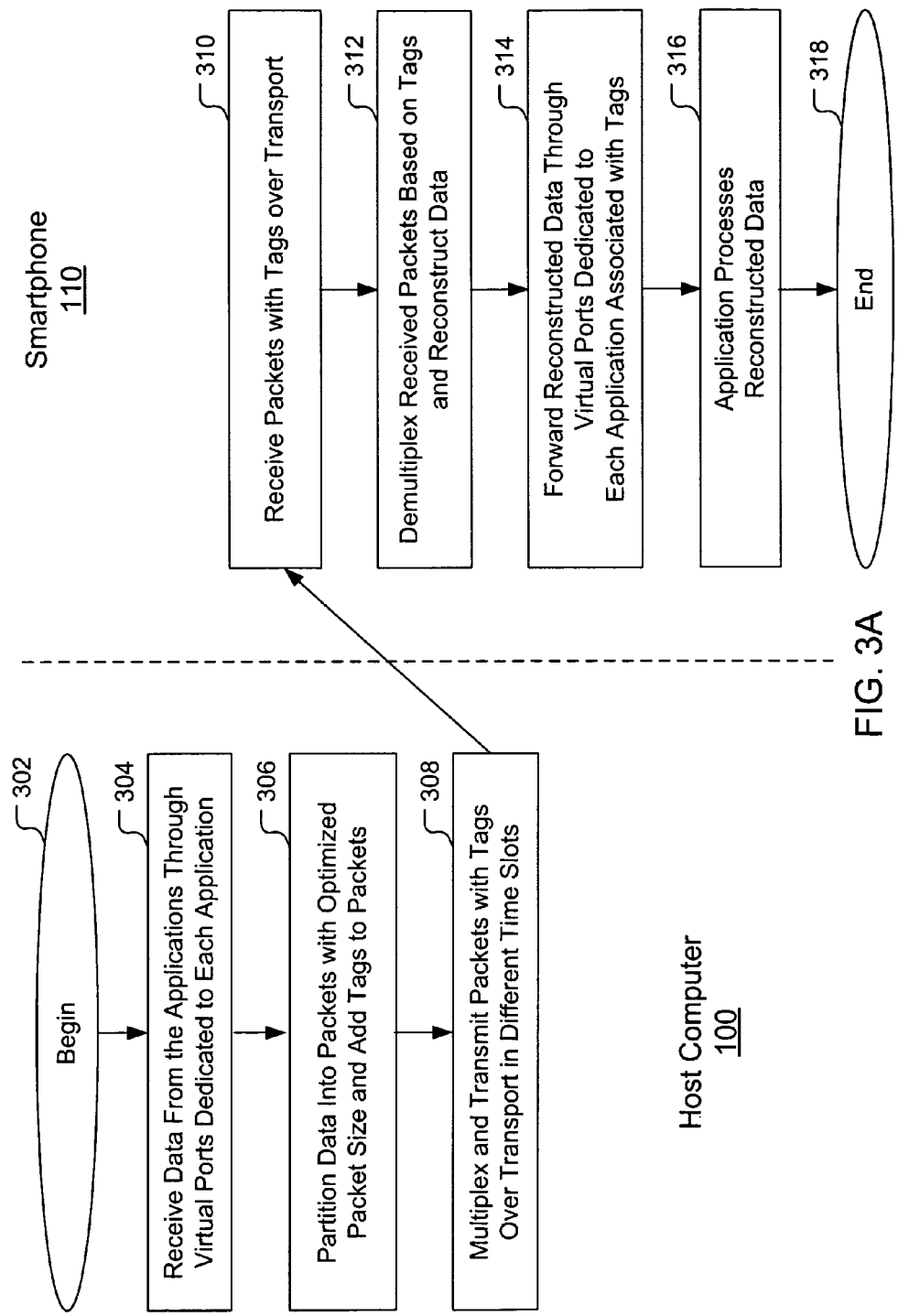
FIG. 3A is a flowchart illustrating the method of communication from the host computer to the smartphone over the transport including multiple virtual channels, according to one embodiment of the present invention.

FIG. 3A is a flowchart illustrating the method of communication from the host computer 100 to the smartphone 110 over the transport 115 including multiple virtual channels, according to one embodiment of the present invention. As the process begins 302, the MUX/DEMUX module 208 of the host computer 100 receives 304 data from multiple applications through virtual ports 220 dedicated to each application. The MUX/DEMUX module 208 partitions 306 the data into packets with optimized packet sizes for the associated transport 115 and adds 306 tags to the packets where the tags indicate the associated virtual port, the associated application, or the data type or priorities of the associated application. Then, the MUX/DEMUX module 208 multiplexes and transmits 308 the packets with the tags over the transport 115 in different time slots.

THE MUX/DEMUX module 252 of the smartphone 110 receives 310 the packets with the tags over the transport 115, and de-multiplexes 312 the received packets based on the attached tags to reconstruct the data according to their associated tags. Then, the MUX/DEMUX module 252 forwards 314 the reconstructed data through the virtual ports 260 dedicated to each application. The application processes 316 the reconstructed data, and the process ends 318.

FIG. 3B is a flowchart illustrating the method of communication from the smartphone 110 to the host computer 100 over the transport 115 including multiple virtual channels, according to one embodiment of the present invention. As the process begins 352, the MUX/DEMUX module 252 of the smartphone receives 354 data from multiple applications running on the application processor 172 through virtual ports 260 dedicated to each application. The MUX/DEMUX module 252 partitions 356 the data into packets with optimized packet size for the associated transport 115 and adds 356 tags to the packets where the tags indicate the associated virtual port, the associated application, or the data type or priorities of the associated application. Then, the MUX/DEMUX module 252 then multiplexes and transmits 358 the packets with the tags over the transport 115 in different time slots.

THE MUX/DEMUX module 208 of the host computer 100 receives 360 the packets with the tags over the transport 115, and de-multiplexes 362 the received packets based on the attached tags to reconstruct the data according to the associated tags. Then, the MUX/DEMUX module 208 forwards 362 the reconstructed data through the virtual ports 220 dedicated to each application as identified by the tags. The host computer processor 102 processes 366 the data for their associated applications, and the process ends 368.

Figure 4:
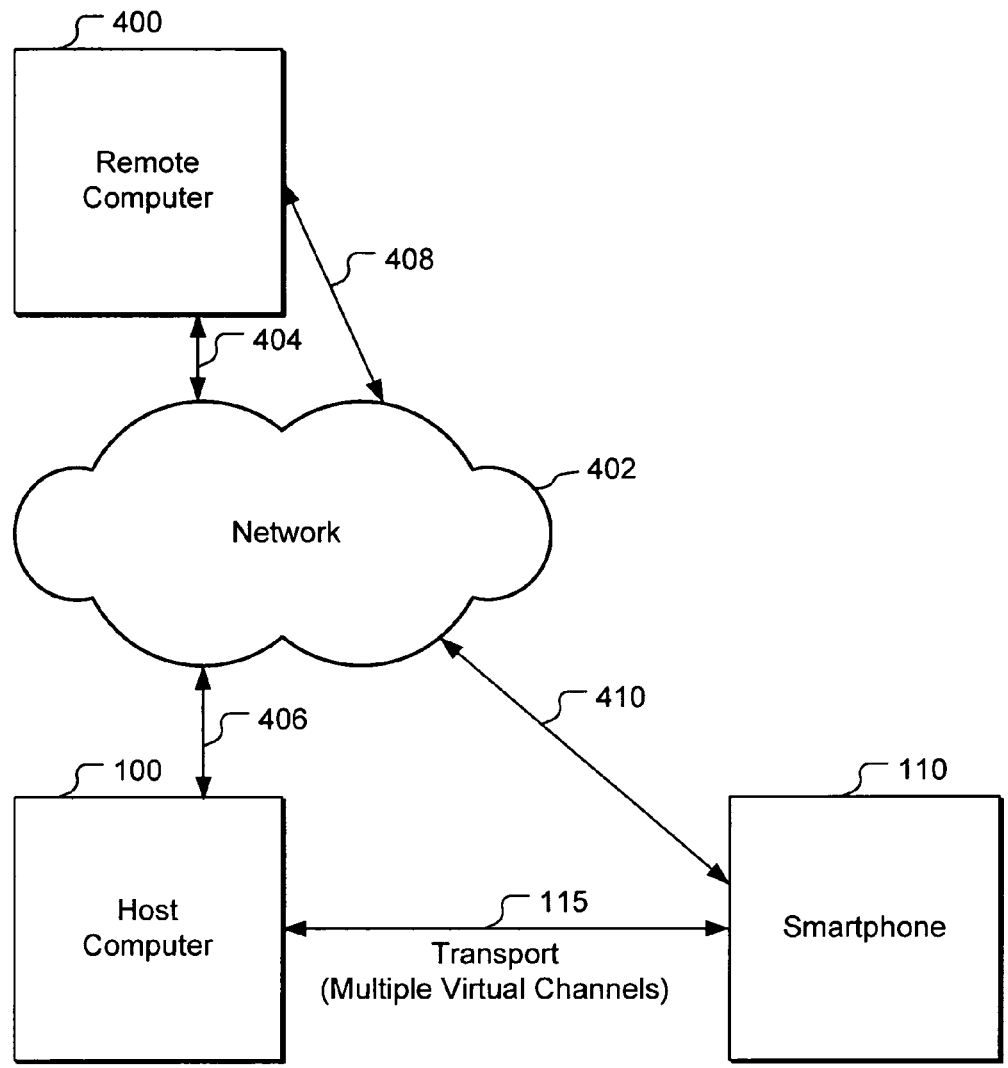
FIG. 4 illustrates a remote computer communicating with the smartphone through the host computer over the transport including multiple virtual channels, according to one embodiment of the present invention.

FIG. 4 illustrates a remote computer 400 communicating with the smartphone 110 through the host computer 100 over the transport 115 including multiple virtual channels, according to one embodiment of the present invention. An application (not shown) running on the remote computer 400 can access 404, 406 the host computer 100 through a data network 402 such as the Internet via conventional methods of remote access to computers over a network. The application running on the remote computer 400 is treated by the MUX/DEMUX module 208 of the host computer 100 just like any other application running on the host computer 100, because the applications for the host computer 100 can be transport-agnostic due to the separation of the MUX/DEMUX module 208 from the transport interface module 210. Therefore, data from the application running on the remote computer 400 is multiplexed and transmitted by the MUX/DEMUX module 208 over the transport 115 just like data from any other application running on the host computer 100, to eventually reach the smartphone 110. Therefore, it is possible for a user or application of the remote computer 400 to access the smartphone 110, while the host computer 100 is also communicating with the smartphone 110 over the same transport 115. For example, a test application running on a remote computer 400 may be able to access the smartphone 110 through the host computer 100 and the transport 115 to test the radio functions of the smartphone 110. Note that the remote computer 400 can also access the host computer 110 in a reverse direction, i.e., through 408, 410 the network 402, the smartphone 110 and over the transport 115 in a similar manner.

Although the disclosure herein makes references in some embodiments to interaction between a personal computer and a portable computing device or a smartphone, the principles disclosed herein are applicable to any configuration in which two computing devices are communicatively coupled. For example, in some embodiments there may be communications between a first computing device and a second computing device wherein the first device can be any type of computing device (e.g., a server computer system, a personal computer, a desktop computer, a laptop computer, a personal digital assistant, a gaming device, a smart phone, a portable computing system, and the like) and the second device can be any type of computing device (e.g., also a server computer system, a personal computer, a desktop computer, a laptop computer, a personal digital assistant, a gaming device, a smartphone, and the like), of which one device may be a host and the other device may be a client, or the devices may be peers (e.g., peer to peer connection).

Upon reading this disclosure, those of ordinary skill in the art will appreciate still additional alternative structural and functional designs for a system and a process for communicating between the host computer and the smartphone through the disclosed principles of the present invention. Note that the communication method of the present invention is applicable regardless of the type of operating systems used in the host computer and the smartphone and regardless of the type of radio or cellular communication standard used in the smartphone. Although some embodiments are described herein as transmitting packets over the transport in different time slots, the packets may also be transmitted over the transport in different frequency slots or by any other method of sharing the transport. Thus, the present invention is not limited to a particular implementation of sharing the transport.

Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of communicating data between a first computing device and a second computing device over a transport employing a communication protocol, the second computing device also including wireless communication capabilities for transmitting data over a wireless network, the method comprising:

generating first packets responsive to receiving first data from a first application executed on the first computing device, wherein the first application comprises a dial-up networking application for utilizing the second computing device as a wireless modem for the first computing device to transmit data over the wireless network;

generating second packets responsive to receiving second data from a second application executed on the first computing device, wherein the second application comprises an application for performing operations on the second computing device other than utilizing the second computing device as the wireless modem for the first computing device;

generating third packets responsive to receiving third data from a third application executed on the first computing device, wherein the third application comprises an application for logging radio performance information of the second computing device, and operates concurrently with the first application;

adding first tags to the first packets, the first tags representing that the first packets include data associated with utilizing the second computing device as the wireless modem;

adding second tags to the second packets, the second tags representing that the second packets include data not associated with utilizing the second computing device as the wireless modem;

adding third tags to the third packets, the third tags representing that the third packets include data associated with radio performance of the second computing device;

multiplexing the first, the second and the third packets added with the first, second and third tags, respectively; and transmitting the multiplexed packets over the transport according to the communication protocol.

2. The method of claim 1, wherein the data is received through a first virtual port, a second virtual port or third virtual port associated with the first application, the second application or the third application, respectively.

3. The method of claim 1, wherein generating the first packets comprises:

generating first packets with packet sizes optimized for characteristics of the transport.

4. The method of claim 3, wherein generating the first packets comprises:

dynamically adjusting the first packet sizes depending upon characteristics of the transport.

5. The method of claim 1, wherein transmitting the multiplexed packets comprises:

transmitting the packets corresponding to the data received from the first application, the second application and the third application in different time slots.

6. The method of claim 5, wherein transmitting the multiplexed packets comprises:

transmitting the first packets with higher priority than the second and third packets.

7. The method of claim 1, wherein at least one of the first data, the second data or the third data is in a format or configuration that is inconsistent with the communication protocol.

8. The method of claim 1, wherein the transmitted packets are de-multiplexed on the second computing device based upon the first tags, the second tags and the third tags to reconstruct the first data, the second data and the third data, respectively.

9. The method of claim 1, further comprising:

receiving additional packets over the transport, the additional packets including additional tags corresponding to the first application, the second application or the third application; and de-multiplexing the additional packets based upon the additional tags for processing by the first application, the second application or the third application.

10. The method of claim 1, wherein the transport is dedicated to communication between the first computing device and the second computing device.

11. A first computing device communicating data with a second computing device over a transport employing a communication protocol, the second computing device also including wireless communication capabilities for transmitting data over a wireless network, the first computing device comprising:

a first virtual port for receiving first data from a first application executed on the first computing device, wherein the first application comprises a dial-up networking application for utilizing the second computing device as a wireless modem for the first computing device to transmit data over the wireless network;

a second virtual port for receiving second data from a second application executed on the first computing device, wherein the second application comprises an application for performing operations on the second computing device other than utilizing the second computing device as the wireless modem for the first computing device;

a third virtual port for receiving third data from a third application executed on the first computing device, wherein the third application comprises an application for logging radio performance information of the second computing device, and operates concurrently with the first application;

a multiplexing module configured to:

generate first packets responsive to receiving first data second packets responsive to receiving second data, and third packets responsive to receiving third data;

add first tags to the first packets, the first tags representing that the first packets include data associated with utilizing the second computing device as the wireless modem, add second tags to the second packets, the second tags representing that the second packets include data not associated with utilizing the second computing device as the wireless modem, add third tags to the third packets, the third tags representing that the third packets include data associated with radio performance of the second computing device, and multiplex the first, the second and the third packets added with the first, second and third tags, respectively; and a transport interface module for transmitting the multiplexed packets over the transport to the second computing device according to the communication protocol.

12. The first computing device of claim 11, wherein the multiplexing module generates the first, the second and the third packets with packet sizes optimized for characteristics of the transport.

13. The first computing device of claim 12, wherein the multiplexing module dynamically adjusts the packet sizes of the first, the second and the third packets depending upon the characteristics of the transport.

14. The first computing device of claim 11, wherein the transport interface module transmits the first, the second and the third packets in different time slots.

15. The first computing device of claim 11, wherein the transport interface module transmits the first packets with higher priority than the second and the third packets.

16. The first computing device of claim 11, wherein at least one of the first data, the second data or the third data is inconsistent with the communication protocol.

17. The first computing device of claim 11, wherein:

the transport interface module receives additional packets over the transport, the additional packets including additional tags corresponding to the first application, the second application or the third application; and the multiplexing module also de-multiplexes the additional packets based upon the additional tags for processing by the first application, the second application or the third application.

18. The first computing device of claim 11, wherein the transport is dedicated to communication between the first computing device and the second computing device.

19. A non-transitory computer readable storage medium storing a computer program product adapted to perform a method of communicating data between a first computing device and a second computing device over a transport employing a communication protocol, the second computing device also including wireless communication capabilities for transmitting data over a wireless network, the method comprising:

generating first packets responsive to receiving first data from a first application executed on the first computing device, wherein the first application comprises a dial-up networking application for utilizing the second computing device as a wireless modem for the first computing device to transmit data over the wireless network;

generating second packets responsive to receiving second data from a second application executed on the first computing device, wherein the second application comprises an application for performing operations on the second computing device other than utilizing the second computing device as the wireless modem for the first computing device;

generating third packets responsive to receiving third data from a third application executed on the first computing device, wherein the third application comprises an application for logging radio performance information of the second computing device, and operates concurrently with the first application;

adding first tags to the first packets, the first tags representing that the first packets include data associated with utilizing the second computing device as the wireless modem;

adding second tags to the second packets, the second tags representing that the second packets include data not associated with utilizing the second computing device as the wireless modem;

adding third tags to the third packets, the third tags representing that the third packets include data associated with radio performance of the second computing device;

multiplexing the first, the second and the third packets added with the first, the second and the third tags, respectively; and transmitting the multiplexed packets over the transport according to the communication protocol.

20. The non-transitory computer readable storage medium of claim 19, wherein the data is received through a first virtual port, a second virtual port or a third virtual port associated with the first application, the second application or the third application, respectively.

21. The non-transitory computer readable storage medium of claim 19, wherein generating the first packets comprises:
generating packets with packet sizes optimized for characteristics of the transport.

22. The non-transitory computer readable storage medium of claim 21, wherein generating the first packets comprises:
dynamically adjusting the packet sizes depending upon the characteristics of the transport.

23. The non-transitory computer readable storage medium of claim 19, wherein transmitting the multiplexed packets comprises:
transmitting the packets corresponding to the data received from the first application, the second application and the third application in different time slots.

24. The non-transitory computer readable storage medium of claim 23, wherein transmitting the multiplexed packets comprises:
transmitting the packets corresponding to the data received from the first application with higher priority than the packets corresponding to the data received from the second application and the third application.

25. The non-transitory computer readable storage medium of claim 19, at least one of the first data, the second data or the third data is in a format or configuration that is inconsistent with the communication protocol.

26. The non-transitory computer readable storage medium of claim 19, wherein the transmitted packets are de-multiplexed on the second computing device based upon the first tags, the second tags and the third tags to reconstruct the data corresponding to the first data, the second data and the third data, respectively.

27. The non-transitory computer readable storage medium of claim 19, wherein the method further comprises:
receiving additional packets over the transport, wherein the additional packets including additional tags corresponding to the first application, the second application or the third application; and
de-multiplexing the additional packets based upon the additional tags for processing by the first application, the second application or the third application.

28. The non-transitory computer readable storage medium of claim 19, wherein the transport is dedicated to communication between the first computing device and the second computing device.

* * * * *

UNITED STATES PATENT AND TRADEMARK OFFICE
CERTIFICATE OF CORRECTION

| | | |
|---|---|---|
| PATENT NO. | : 8,082,363 B2 | Page 1 of 1 |
| APPLICATION NO. | : 11/433045 | |
| DATED | : December 20, 2011 | |
| INVENTOR(S) | : Yoon Kean Wong et al. | |

It is certified that error appears in the above-identified patent and that said Letters Patent is hereby corrected as shown below:

In column 14, line 13, in Claim 11, delete "data" and insert -- data, --, therefor.

Signed and Sealed this
Second Day of October, 2012

David J. Kappos
*Director of the United States Patent and Trademark Office*